United States Patent
McMullen (10) Patent No.: US 10,375,159 B2
(45) Date of Patent: Aug. 6, 2019

(54) LOAD BALANCING ORIGIN SERVER REQUESTS

(71) Applicant: Fastly, Inc., San Francisco, CA (US)

(72) Inventor: Tyler B. McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 51 days.

(21) Appl. No.: 15/581,109

(22) Filed: Apr. 28, 2017

(65) Prior Publication Data

US 2017/0318086 A1    Nov. 2, 2017

Related U.S. Application Data

(60) Provisional application No. 62/328,679, filed on Apr. 28, 2016.

(51) Int. Cl.
*H04L 29/08* (2006.01)

(52) U.S. Cl.
CPC ...... *H04L 67/1023* (2013.01); *H04L 67/2842* (2013.01); *H04L 67/1097* (2013.01)

(58) Field of Classification Search
CPC ............. H04L 67/1023; H04L 67/1097; H04L 67/2842; H04L 67/2852; H04L 67/06; H04L 2209/60; H04L 61/1511; H04L 61/6009; H04L 63/0892

See application file for complete search history.

(56) References Cited

U.S. PATENT DOCUMENTS

| | | | | |
|---|---|---|---|---|
| 6,484,143 B1 * | 11/2002 | Swildens | ............... | H04L 12/14 705/1.1 |
| 6,654,807 B2 * | 11/2003 | Farber | ..................... | G06F 9/505 709/225 |
| 6,889,234 B1 * | 5/2005 | Li | ......................... | G06F 16/252 |
| 7,113,962 B1 * | 9/2006 | Kee | ....................... | G06F 16/182 |
| 7,240,100 B1 * | 7/2007 | Wein | ................... | H04L 67/1008 709/214 |
| 7,305,479 B1 * | 12/2007 | Morris | ............... | H04L 67/1008 709/227 |
| 7,590,739 B2 * | 9/2009 | Swildens | .................. | G06F 9/50 370/252 |
| 7,937,477 B1 * | 5/2011 | Day | ..................... | G06Q 20/401 709/227 |

(Continued)

OTHER PUBLICATIONS

Freedman, Mike; "Content Distribution Networks (CDNs)," COS 46: Computer Networks, printed Mar. 4, 2019. (Year: 2019).*

*Primary Examiner* — Alina A Boutah (57) ABSTRACT

Disclosed herein are enhancements for operating a content delivery network to load balance origin requests to origin servers. In one implementation, a method of operating a content delivery network comprising a plurality of cache nodes that cache content between end user devices and origin servers includes, in a first cache node of the plurality of cache nodes, obtaining distribution information indicative of how each cache node in the plurality of cache nodes has distributed content requests to the origin servers. The method further provides, in the first cache node maintaining a load balancing profile for the plurality of origin servers based on the distribution information, and distributing a content request to an origin server in the plurality of origin servers based at least in part on the load balancing profile for the plurality of origin servers.

20 Claims, 8 Drawing Sheets

(56) References Cited

U.S. PATENT DOCUMENTS

| | | | | |
|---|---|---|---|---|
| 8,122,098 B1* | 2/2012 | Richardson | H04L 61/1511 | 709/217 |
| 9,197,505 B1* | 11/2015 | Hill | H04L 67/303 | |
| 9,525,659 B1* | 12/2016 | Sonkin | H04L 61/1511 | |
| 9,553,924 B1* | 1/2017 | Duzett | H04L 67/1002 | |
| 2002/0062372 A1* | 5/2002 | Hong | H04L 29/06 | 709/225 |
| 2008/0229021 A1* | 9/2008 | Plamondon | H04L 67/2847 | 711/125 |
| 2008/0229025 A1* | 9/2008 | Plamondon | G06F 12/0862 | 711/126 |
| 2009/0064165 A1* | 3/2009 | Arimilli | G06F 9/5083 | 718/105 |
| 2009/0327489 A1* | 12/2009 | Swildens | G06F 9/505 | 709/224 |
| 2011/0047252 A1* | 2/2011 | Kwapniewski | H04L 29/12066 | 709/220 |
| 2011/0153864 A1* | 6/2011 | Prasad | H04L 29/12066 | 709/242 |
| 2011/0153941 A1* | 6/2011 | Spatscheck | G06F 9/5083 | 711/119 |
| 2011/0202633 A1* | 8/2011 | Koike | H04N 21/222 | 709/219 |
| 2011/0252100 A1* | 10/2011 | Raciborski | H04L 67/06 | 709/206 |
| 2012/0016933 A1* | 1/2012 | Day | H04L 63/102 | 709/203 |
| 2012/0084359 A1* | 4/2012 | Mizutani | H04L 29/12066 | 709/204 |
| 2013/0262697 A1* | 10/2013 | Karasaridis | H04L 67/2847 | 709/242 |
| 2014/0032849 A1* | 1/2014 | De Vleeschauwer | G06F 12/0862 | 711/133 |
| 2014/0052822 A1* | 2/2014 | Rodriguez Rodriguez | H04L 67/1008 | 709/218 |
| 2015/0381757 A1* | 12/2015 | Yoo | H04L 45/44 | 709/213 |
| 2016/0285992 A1* | 9/2016 | Katsev | H04L 67/2842 | |
| 2016/0380883 A1* | 12/2016 | Shaw | G06F 16/00 | 370/254 |
| 2017/0094006 A1* | 3/2017 | Wistow | H04L 67/2842 | |
| 2017/0188054 A1* | 6/2017 | Ma | H04L 67/2814 | |

* cited by examiner

LOAD BALANCING ORIGIN SERVER REQUESTS

RELATED APPLICATIONS

This application hereby claims the benefit of and priority to U.S. Provisional Patent Application 62/328,679, titled "LOAD BALANCING ORIGIN SERVER REQUESTS," filed Apr. 28, 2016, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery systems have been developed which add a layer of caching between the origin servers of the content providers and the end users. The content delivery systems typically have one or more cache nodes distributed across a large geographic region to provide faster and lower latency access to the content for the end users. When end users request content, such as a web page, which is handled through a cache node, the cache node is configured to respond to the end user requests instead of the origin servers. In this manner, a cache node can act as a proxy for the origin servers.

Content of the origin servers can be cached into the cache nodes, and can be requested via the cache nodes from the origin servers of the content originators when the content has not yet been cached. Cache nodes usually cache only a portion of the original source content rather than caching all content or data associated with an original content source. The cache nodes can thus maintain only recently accessed and most popular content as cached from the original content sources. Thus, cache nodes exchange data with the original content sources when new or un-cached information is requested by the end users or if something has changed in the original content source data.

While cache nodes may request content from the origin servers, in sonic implementations, multiple origin servers may store the same origin content. Consequently, the cache nodes of the content delivery network may be capable of using multiple origin servers when content is not readily available at the cache nodes. However, because each of the cache nodes may refer to multiple origin servers to retrieve the same content, it may become difficult to balance the requests to each of the origin servers.

OVERVIEW

Examples disclosed herein provide enhancements for balancing origin request loads to origin servers. In one implementation, a method of operating a content delivery network comprising a plurality of cache nodes that cache content between end user devices and origin servers includes, in a first cache node of the plurality of cache nodes, obtaining distribution information indicative of how each cache node in the plurality of cache nodes has distributed content requests to the origin servers. The method further provides, in the first cache node maintaining a load balancing profile for the plurality of origin servers based on the distribution information, and distributing a content request to an origin server in the plurality of origin servers based at least in part on the load balancing profile for the plurality of origin servers.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.alpha.com," but may include various other content. In some examples, origin servers can serve the content to end user devices. However, when a content delivery system is employed, the content delivery system can act as a proxy to cache content between origin servers and the end user devices.

Content delivery systems can add a layer of caching between origin servers of the content providers and the end users. The content delivery systems typically have one or more cache nodes distributed across a large geographic region to provide faster and lower latency local access to the content for the end users. When end users request content, such as a web page, a locally proximate cache node will respond to the content request instead of the associated origin server. Various techniques can be employed to ensure the cache node responds to content requests instead of the origin servers, such as associating web content of the origin servers with network addresses of the cache nodes instead of network addresses of the origin servers using domain name system (DNS) registration and lookup procedures.

In some implementations, the cache nodes of the content delivery network may only cache a portion of the content that is stored on the origin origin servers. Consequently, if a request is generated by an end user device that cannot be satisfied by the cache node, the cache node may be required to generate an origin content request to retrieve the required content. These origin requests, in sonic examples, may be processed using any one of a plurality of origin servers, wherein the origin servers are each capable of responding to the origin requests. Instead of using a distribution node between the cache nodes and the origin servers to distribute the origin requests, the implementations described herein permit the individual cache nodes to communicate origin request information with other nodes and modify the distribution of origin requests to each of the origin servers without the use of a distribution node.

Figure 1:
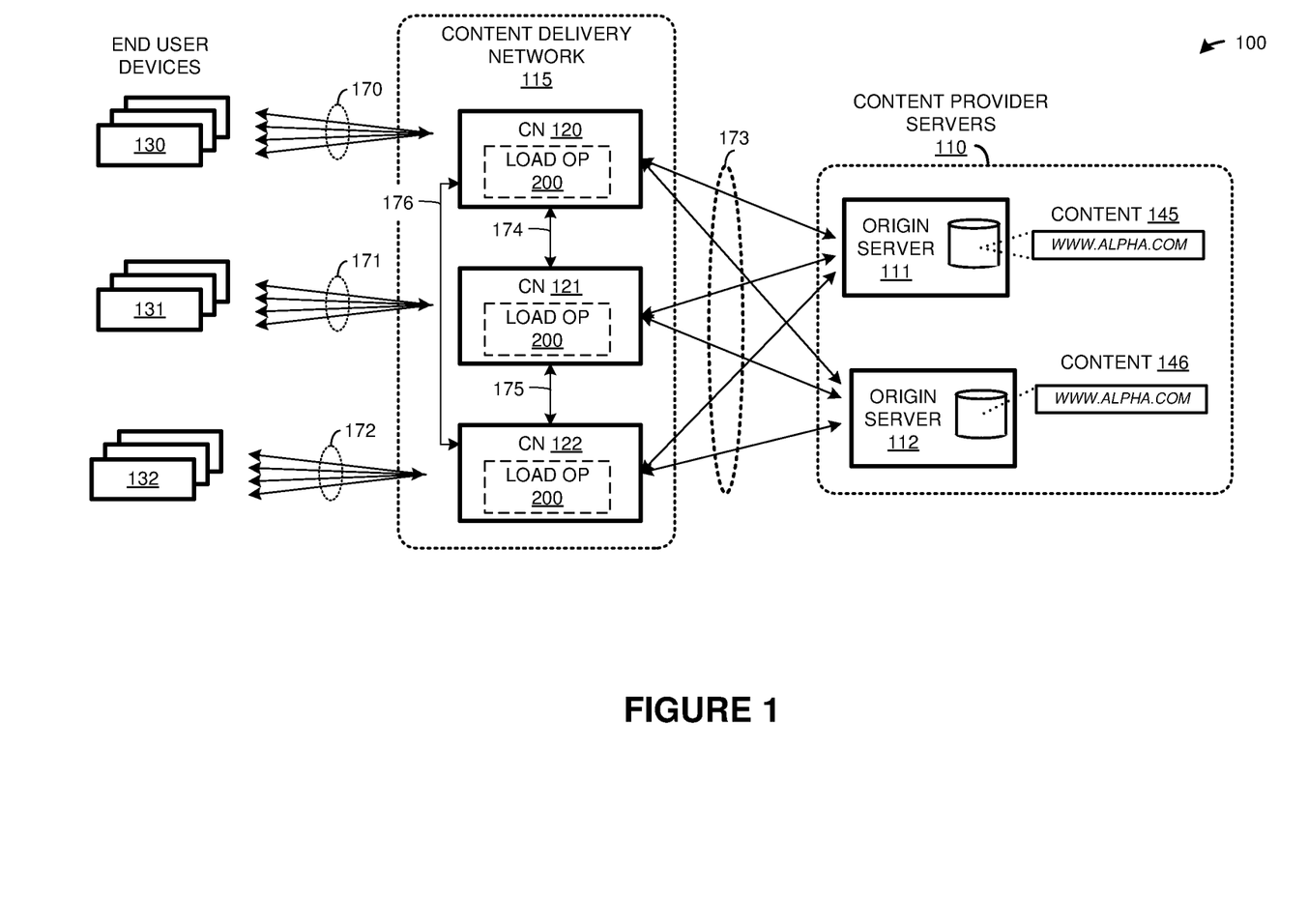
FIG. 1 illustrates a communication system to distribute origin requests to multiple origin servers according to one implementation.

Referring now to FIG. 1, FIG. 1 illustrates a communication system to distribute origin requests to multiple origin servers according to one implementation. FIG. 1 illustrates a communication system 100 to distribute origin requests to multiple origin servers according to implementation. Communication system 100 includes end user devices 130-132, content nodes (CNs) 120-122, and origin servers 111-112. CNs 120-122 make up content delivery network 115, which caches content from content provider servers 110, including origin servers 111-112. End user devices 130-132 communicate with CNs 120-122 via communication links 170-173. CNs 120-122 communicate with origin servers 111-112 via communication link 173, and further communicate with one another via communication links 174-176.

To further illustrate FIG. 1, a brief description of the operation of communication system 100 is provided. In operation, end user devices 130-132 request network content, such as content 145-146, from CNs 120-122 in content delivery network 115. In particular, rather than being directed to origin servers 111-112, CNs 120-122 act as proxy servers that cache content in local storage systems from origin servers 111412 and provide the content, if available, to the requesting end user devices.

In some implementations, to gather required content for end user devices 130-132, CNs 120-122 may be required to make origin content requests to retrieve the required content from origin servers 111-112. For example, if a user device in end user devices 130-132 requests content that is not cached in the associated CN, the CN may request one of origin servers 111-112 for the required content, and provide the content to the requesting end user device. Further, in some implementations, the CN may cache the retrieved content in storage to provide for the next content request. As illustrated in FIG. 1. each of CNs 120-122 is capable of requesting content from either origin server 111-112. To distribute the content requests to each of the origin servers, CNs 120-122 may provide, to one another, origin distribution information at defined intervals to prevent an uneven distribution of requests to the origin servers in content provider servers 110. In particular, this origin distribution information may include a quantity of origin requests to each of the origin servers, an amount of data or content being transferred to the CNs by each of the origin servers, or any other similar origin distribution information. Once received, a CN may update a load balancing profile for the origin servers, using load operation (op) 200, such that future requests are distributed based on the information received from other CNs, as well as information identified in the local CN.

Figure 2:
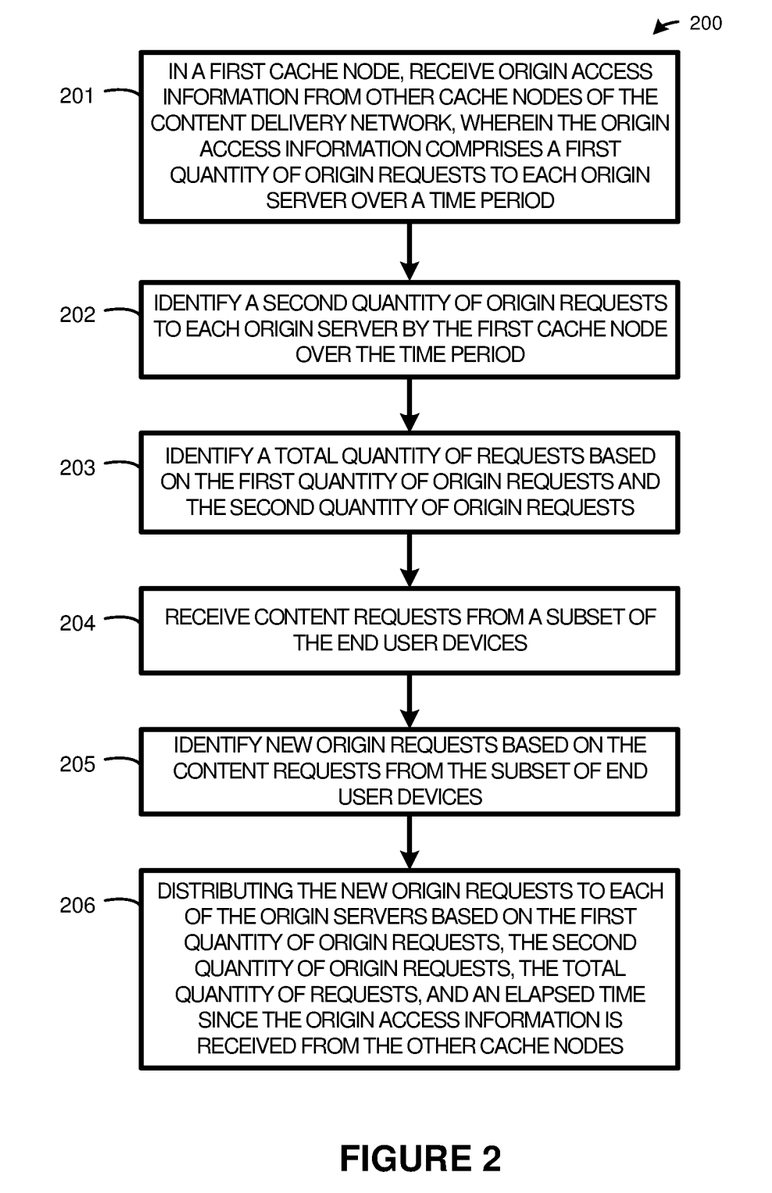
FIG. 2 illustrates a method of operating a cache node in a content delivery network to distribute origin requests to multiple origin servers according to one implementation.

To further demonstrate the distribution of origin requests in content network 115, FIG. 2 is provided. FIG. 2 illustrates a load operation 200 of operating a cache node in a content delivery network to distribute origin requests to multiple origin servers according to one implementation. The operations of FIG. 2 are referenced parenthetically in the paragraphs that follow, along with references to the elements and systems from communication system 100 of FIG. 1.

As described previously in claim 1, CNs 120-122 cache content from content provider servers 110 to provide the content more efficiently to end user devices 130-132. When a request is received from an end user device, a CN in CNs 120-122 will determine whether the content is cached locally at the cache node and, if cached locally, provide the content to the end user device. However, if the content is unavailable, the CN in CNs 120-122 may be required to make an origin request to retrieve the required data for the end user device. Once retrieved, the content may be provided to the end user device and optionally cached in storage on the CN to be provided in future content requests. It should also be understood that CNs 120-122 may also require an origin request in response to a purge request to replace content that is currently cached on the CN, or some other similar direction to retrieve new content from origin servers 111-112. Thus, origin requests may be initiated in response to a request from origin servers 111-112, requests from end user devices 130-132, or responsive to an administrative system (not pictured) capable of modifying the cached. content located on each of CNs 120-122.

To distribute the various origin requests to origin servers 111-112, load operation 200 is provided on each of CNs 120-122. Load operation 200 directs a CN in CNs 120-122 to receive origin distribution information, as a plurality of reports, from other cache nodes in content delivery network 115, wherein the origin distribution information comprises a first quantity of origin requests to each origin server in the plurality of origin servers over a time period (201). Referring to the example in communication system 100, CN 120 may receive origin distribution information from CNs 121-122 indicating the number of requests to each origin server of origin servers 111-112. In addition to receiving information from other CNs, load operation 200 directs a CN in CNs 120-122 to identify a second quantity of origin requests to each origin server in the plurality of origin servers by the CN over the time period (202). Referring again to the example of CN 120, CN 120 may identify a quantity of requests by CN 120 to each origin server in origin servers 111-112.

Once the information is obtained for the local CN and other CNs in content delivery: network 115, load operation 200 further directs the CN to identify a total quantity of requests to the plurality of origin servers based on the first quantity of origin requests and the second quantity of origin requests (203), and receive content requests from a subset of end user devices (204). As the content requests are received, load operation 200 includes identifying new origin requests based on the content requests from the end user devices (205), and distributing the new origin requests to each of the origin servers to balance a load on the origin servers based on the first quantity of requests, the second quantity of origin requests, the total quantity of requests, and an elapsed time since the origin distribution information is received from the other cache nodes (206).

Using the example of CN 120, CN 120 may receive new content requests from end user devices 130 and distribute any required origin requests to origin servers 111-112 based on the origin distribution information provided from CNs 121-122, as well as the origin distribution information maintained by CN 120. For example, if CN 121 could not communicate with origin server 111 over a previous time period, the origin distribution information may indicate that a greater number of origin access requests are being transferred to origin server 112. Responsive to this determination, CN 120 may modify the distribution of origin requests to increase the number of requests to origin server 112, while decreasing the number of requests to origin server 111. Thus, while CN 121 may increase the number of requests to origin server 112, the other CNs in content delivery network 115 may compensate for the operation of that particular node.

In some examples, the elapsed time since the origin distribution information is received from the other CNs may permit a CN to dynamically change the distribution of new origin requests over time. For example, CN 120 may put more weight on information that was received in recent reports than information that was received from earlier reports. Thus, if CN 120 identified, based on the origin distribution information from other nodes and the local origin distribution information, that origin server 111 was receiving an overwhelming number of origin requests in comparison to origin server 112, CN 120 may distribute an initial ratio of origin requests to origin servers 111-112 that favors more origin requests to origin server 112. However, over time, CN 120 may reduce the amount that origin server 112 is favored based on the time since the origin distribution information was received, as the information from the alternative CNs may no longer accurately reflect the state of the system. Although this is one example of managing the distribution of origin requests based on timestamps and elapsed time since origin distribution information is received, it should be understood that other methods of modifying a distribution scheme to the origin servers based on the elapsed time are within the scope of the disclosure.

In some implementations, CNs 120-122 may be scheduled to transfer origin distribution information at defined interval, however, it should also be understood that origin distribution information may be transferred based on the request of each CN, based on a network condition identified by a CN, or based on any other similar factor. For example, CN 120 may request origin distribution information from CNs 121-122 when it is required by CN 120.

In some examples, in addition to the quantity of origin requests that are transferred between CNs 120-122, it should be understood that additional origin distribution information may exchanged between the CNs of the content delivery network. This information may include the quantity of data being retrieved from each of the origin servers, the latency incurred during requests to each of the origin servers, or any other similar related information to load on the origin servers. For example, if the origin distribution information received from the alternative cache nodes indicated that a large quantity of data was retrieved from origin server 111 over origin server 112, then a cache node may, based on the information, transfer a larger ratio of requests to origin server 112 to load balance the origin requests.

Further, in some implementations, distributing the requests based on origin distribution information from other CNs may only occur when access criteria are met for origin servers 111-112. This access criteria may include a proportion value for one origin server requests exceeding the proportion value for other origin server requests, a total number of requests for the origin servers meeting a threshold, or some other similar access criteria, including combinations thereof. For example, if origin server 111 were receiving a far greater amount of content requests than origin server 112, this could trigger the implementation of distributing origin requests based on origin distribution information provided from other CNs in content delivery network 115. However, if the origin access requests to each origin server in origin servers 111-112 remained within proportion to one another, the CNs may continue the current distribution of origin requests.

In some examples, to distribute new origin requests based on the distribution information obtained from other CNs, as well as the distribution information maintained by the local CN, the local CN may maintain a load balancing profile that indicates a distribution scheme to the origin nodes. In particular, a CN may obtain distribution information indicative of how each cache node in the plurality of cache nodes has distributed content requests to the plurality of servers, wherein the distribution information may include a quantity of requests to each of the origin servers, a quantity of data retrieved from each of the origin servers, or any other similar distribution information. As the distribution information is obtained, locally and from the other cache nodes, the CN may maintain a load balancing profile for the plurality of origin servers based on the distribution information that indicates a distribution scheme for future origin requests to balance the load on the individual origin servers. Consequently, as new origin content requests are required, the cache node may distribute the new content requests to the plurality of origin servers based at least in part on the maintained load balancing profile.

Figure 3A:
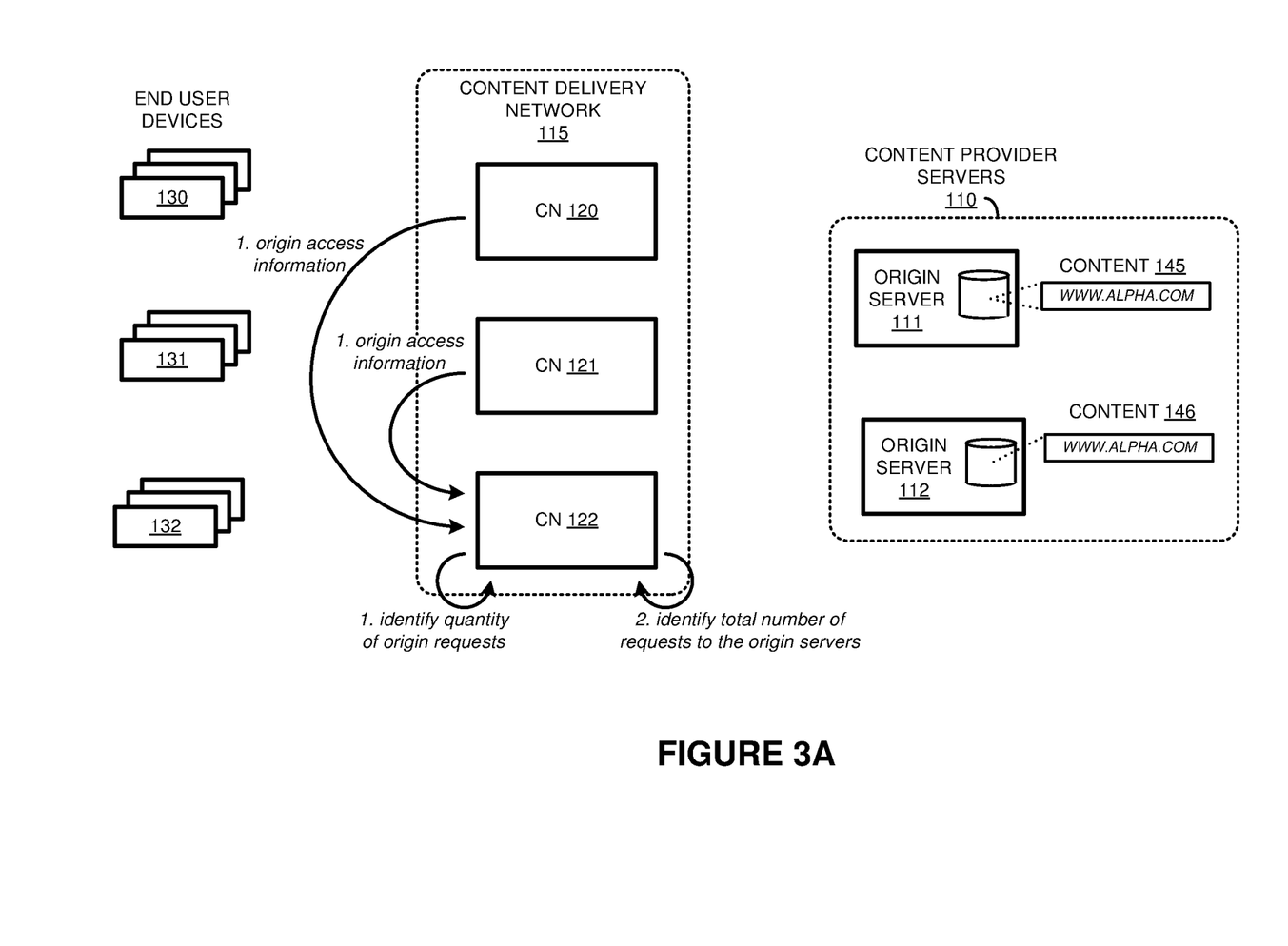
FIG. 3A illustrates an operational scenario of distributing origin requests to multiple origin servers according to one implementation.
Figure 3B:
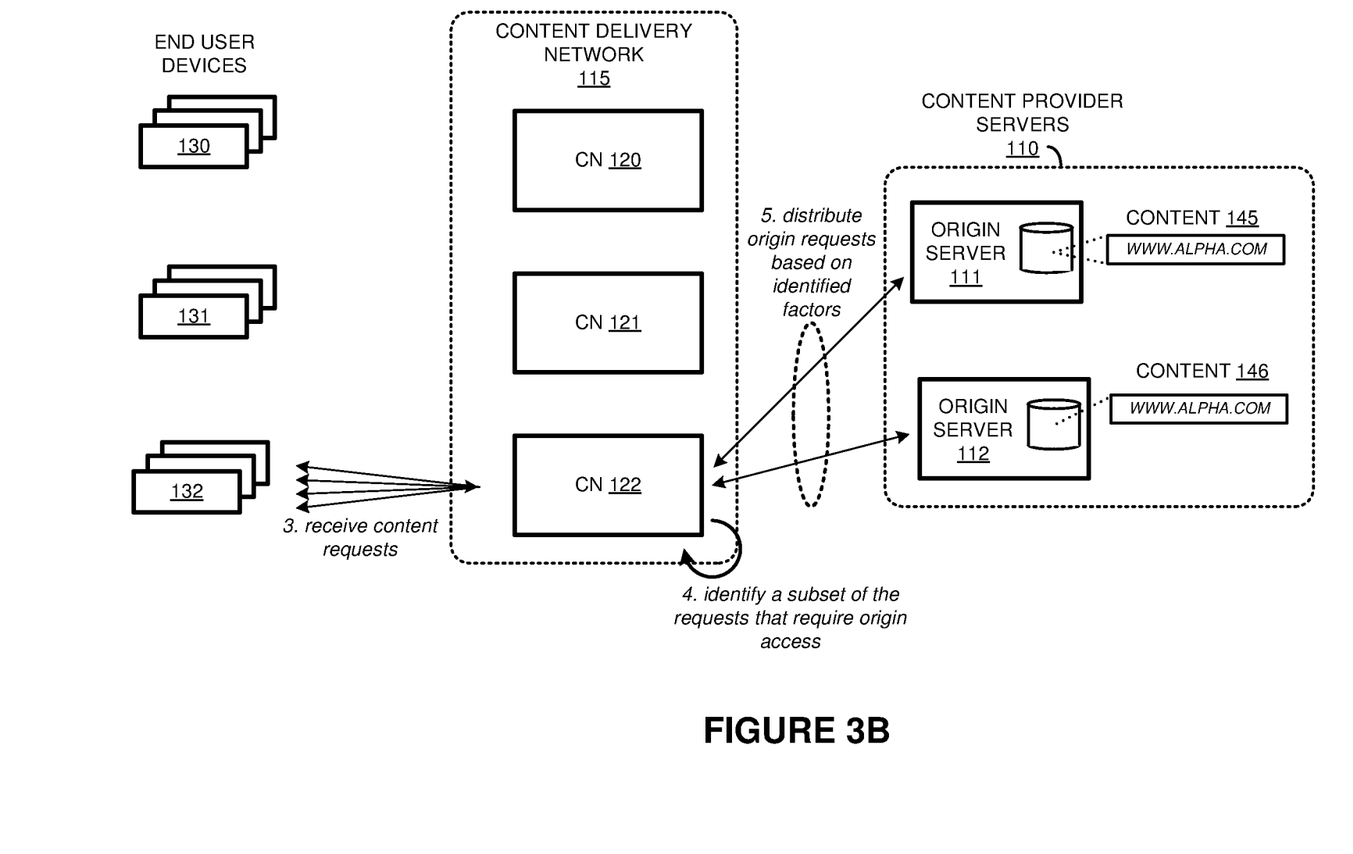
FIG. 3B illustrates an operational scenario of distributing origin requests to multiple origin servers according to one implementation.

FIGS. 3A and 3B illustrate an operational scenario of distributing origin requests to multiple origin servers according to one implementation. FIGS. 3A and 3B include the elements and systems of communication system 100 from FIG. 1.

Referring to FIG. 34, CNs 120-122 cache content from origin servers 111-112 and provide the content to end user devices 130-132. To maintain and update the content on CNs 120-122, CNs 120-122 may require origin requests to update the content that is cached on the local storage systems of the CNs. These origin requests may come based on end user requests from end user devices 130-132, may come in response to content modification requests from the origin servers, may come from an external control system capable of modifying the cached content at the CNs, or may come from any similar source. For example, if an end user device requested a page for "www.alpha.com," but elements of the page, such as pictures, videos, and the like were not cached at the CN, the CN may request an origin server in origin servers 111-112 for the content, and provide the requested content to the end user.

Here, to ensure that neither origin server of origin servers 111-112 is overloaded with content requests from content delivery network 115, the nodes are configured to distribute origin requests based on origin distribution information from other CNs in the network. In the example of FIG. 34, CNs 120-121, at step 1, transfer origin distribution information, as a plurality of reports, to CN 122, wherein the access information includes a quantity of access requests to origin server 111 over a time period, and a quantity of access requests to origin server 112 over the time period. Before, during, or after receiving the origin distribution information, CN 122, also at step 1, identifies additional origin distribution information, including at least a quantity of origin requests to each origin server of origin servers 111-112. Once the quantity of origin requests is received from CNs 120-121 and determined locally for CN 122, CN 122, at step 2, identifies a total number of requests to the origin servers. This total number of requests may assist CN 122 in determining whether one of the origin servers in origin servers 111-112 has received a disproportionate number of content requests than the other origin server. For example, based on the information from CNs 120-121 and the information identified locally at CN 122, CN 122 may determine that origin server 112 is receiving seventy percent of the origin requests, while origin server 111 is receiving thirty percent of the requests. This may cause unnecessary processing resources to be used on origin server 112, may cause delay in responding to the origin requests at origin server 112, or may cause other issues related to the physical resources at origin server 112 or the response to origin requests at origin server 112.

Referring now to FIG. 3B, which is a continuation of the operational scenario described in FIG. 3A, once the origin request information is determined for the CNs in content delivery network 115, end user devices 132, at step 3, may transfer content requests that are received by CN 122. As the requests are received, CN 122, at step 4, identifies a subset of the requests that require origin access. For example, if content is not available in the cache storage of CN 122 to support the request of an end user device, CN 122 may use content provider servers 110 to retrieve the required content. Here, a subset of the requests received from end user devices 132 cannot be processed using the content stored on CN 122. Consequently, CN 122 identifies a subset of the requests that require origin origin requests and distributed the origin requests to origin servers 111-112, at step 5, based on the identified origin distribution information from the CNs within content delivery network 115.

In some implementations, the distribution of the origin requests from CN 122 may be based on the quantity of origin requests by CNs 120-122 to each origin server of origin servers 111-112, the total number of origin requests processed by CNs 120-122, and the amount of time since the information was obtained from CNs 120-121, wherein the amount of time since the information was obtained from the other CNs may assist CN 122 in determining and dynamically modifying the ratio for which origin requests are transferred to each of the content nodes.

Referring to an example distribution, CN 122 may determine that over a particular time period, CNs 120-122 distributed seventy percent of all origin requests to origin server 111, while thirty percent of the origin requests were transferred to origin server 112. In response to making this determination, via the origin distribution information obtained for CNs 120-122, CN 122 may modify the distribution of future origin requests to increase the ratio of requests that are transferred to origin server 112. Accordingly, if CN 122 were, prior to the determination of the imbalanced distribution, distributing content requests evenly to origin server 111 and origin server 112, CN 122 may increase the ratio of requests to origin server 112 to counter the imbalance reported from the other content nodes.

In some examples, in addition to the quantity of origin requests that are transferred between CNs 120-122, it should be understood that additional origin distribution information may be exchanged between the CNs of the content delivery network. This information may include the quantity of data being retrieved from each of the origin servers, the latency incurred during requests to each of the origin servers, or any other similar related information to load on the origin servers. For example, if the origin distribution information received from the alternative cache nodes indicated that a large quantity of data was retrieved from origin server 111 over origin server 112, then a cache node may, based on the information, transfer a larger ratio of requests to origin server 112 to load balance the origin requests.

In some implementations, as the origin distribution information is obtained for CNs 120-122, CN 122 may generate and maintain a load balancing profile for the plurality of origin servers based on the origin distribution information. In particular, the load balancing profile may indicate a scheme to distribute newly identified origin content requests based on the distribution information each of the CNs. This profile may be determined based on the quantity of requests to each of the origin servers, the amount of data retrieved from each of the origin servers, timestamps or elapsed time since distribution information is received as reports from the various CNs, or any other similar information. For example, more recent reports of distribution information from CNs of the network may be favored over reports that were received from an earlier timer period. As the profile is maintained, when a new origin content request is required, the request may be distributed to one of the plurality of origin servers based on the load balancing profile maintained for the origin servers.

Figure 4:
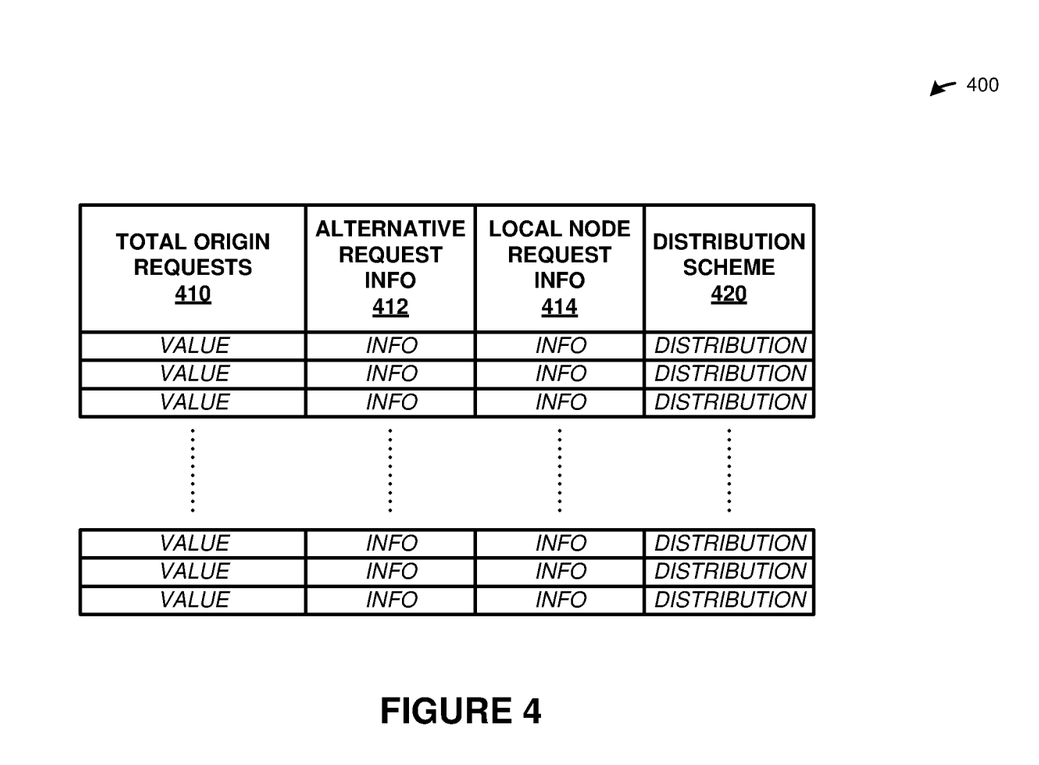
FIG. 4 illustrates a data structure to generate a distribution scheme for origin requests based on information provided from alternative cache nodes according to one implementation.

FIG. 4 illustrates a data structure 400 to generate a distribution scheme for origin requests based on information provided from alternative cache nodes according to one implementation. Data structure 400 includes columns for total origin requests 410, alternative request information (info) 412, local node request information (info) 414, and distribution scheme 420. Although illustrated with four columns in the present example, it should be understood that any number of columns may be used to make the determination of a distribution scheme. Further, while illustrated in the present implementation as a table, it should be understood that other data structures including data trees, linked lists, arrays, or other similar data structures, including combinations thereof may be used in determining a distribution scheme.

As described herein, cache nodes of a content delivery network may exchange origin distribution information with one another permitting the nodes to monitor the current load on the origin servers generated by origin requests. In particular, a cache node of the content delivery network may receive origin distribution information from at least one alternative cache node in the content delivery network. Once received, the cache node may apply the received origin distribution information in combination with local Origin distribution information to determine a distribution scheme or profile for future origin requests. Here, to apply the origin distribution information, the cache node determines a total number of origin requests to the Origin servers, a quantity of requests to each origin server by the at least one alternative cache node, and a quantity of requests to each origin server by the local cache node. These values are then applied to total origin requests column 410, alternative request information column 412, and local node request information column 414 to determine a distribution scheme 420 for future origin requests.

Although illustrated in the example of FIG. 4 as using a data structure to determine the distribution scheme or profile for future origin requests, it should be understood that in some implementations, a cache node may apply an algorithm to determine the distribution of future origin requests. Specifically, an algorithm may be used by the cache node to determine the distribution profile based on the received distribution information, as well as the local distribution information for the cache node. Once the distribution profile is determined, new origin requests may be distributed to each of the origin nodes based on the profile.

In some examples, in determining the distribution profile for the origin nodes, a cache node may monitor timestamps indicating when distribution information is reported to the cache node. These timestamps may permit the cache node to favor new distribution information from other cache nodes of the network over distribution information that was received for an earlier period. Consequently, in applying the data structure or algorithm to determine the distribution scheme or profile, the cache node may favor information in more recent reports over information that was received from earlier reports regarding the status of the content delivery network.

Figure 5:
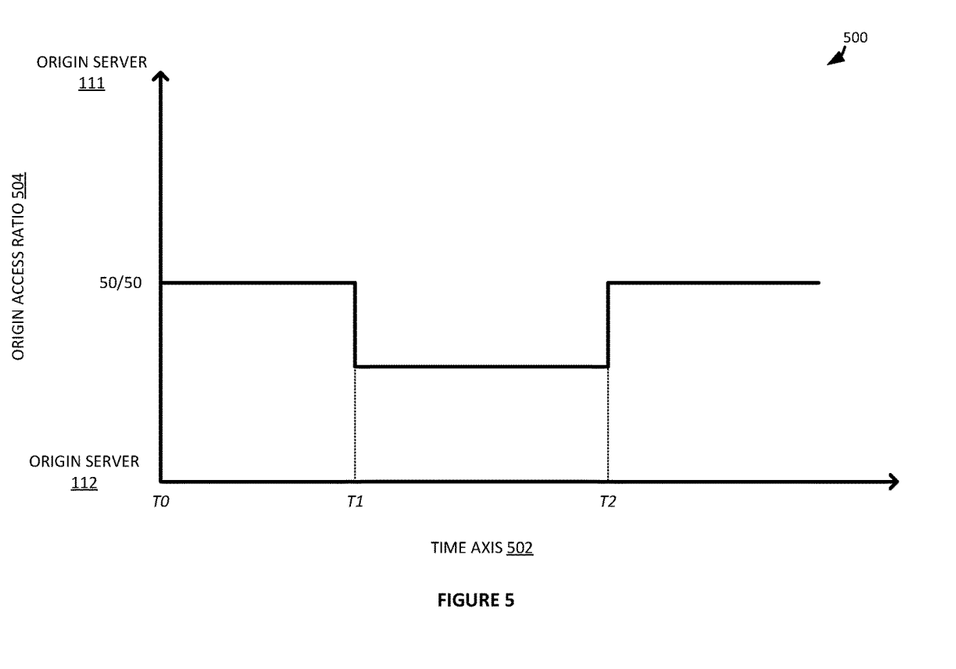
FIG. 5 illustrates a graphical representation of distributing origin requests to origin servers according to one implementation.

FIG. 5 illustrates a graphical representation 500 of distributing origin requests to origin servers according to one implementation. Graphical representation 500 includes origin access ratio 504 and time axis 502. Graphical representation 500 demonstrates the distribution ratio of origin requests from a CN in CNs 120-122 to origin servers 111-112.

As depicted, a CN in CNs 120-122, at time T0, transfers origin requests to origin servers 111-112 at even distribution. These origin requests may occur based on content requests from end user devices, based on timers to retrieve new content in the CN, based on a request from administrative device to retrieve new content from the origin servers, or based on any other similar action. While processing the origin requests and end user requests for cached content, the CN receives origin distribution information from at least one other CN in the content delivery network. Referring to an example using FIG. 1, CN 120 may receive origin distribution information from CNs 121-122, wherein the origin distribution information comprises a quantity of origin requests to each origin server in origin servers 111-112 over a period of time. Further, in addition to the access information from the alternative CNs, CN 120 may also determine local origin distribution information related to the quantity of origin requests to each origin server of origin servers 111-112. Based on the local access information and the information from the alternative nodes, CN 120 may determine a total quantity of origin requests being executed by the CNs.

Once the origin distribution information is determined for the CNs of the content delivery network, CN 120 may distribute new origin requests to each origin server based on the quantity of origin requests from the alternative CNs, the quantity of local origin requests by CN 120, the total quantity of origin requests by CNs 120-122, and an elapsed time since the origin distribution information was received from CNs 121-122.

Referring to graphical representation 500 in FIG. 5, at time T1, the cache node determines that a greater number of origin requests should be transferred to origin server 112 than origin server 111. To cause this distribution modification, in some implementations, the cache node may determine that the overall state of the content delivery network is transferring a greater number of requests to origin server 111 than origin server 112. Referring again to the example with CN 120, CN 120 may identify that CNs 121-122 are transferring a greater number of requests to origin server 111 than origin server 112. This increase in number of requests to origin server 111 may be a result of the requirements of content requests by end user devices, the result of a better communication link with origin server 111 than origin server 112, the type of content required to be retrieved by CNs 121-122, or for any other similar reason.

After time T1 and the cache node transferring a larger ratio of origin requests to origin server 112, the cache node will continue to monitor the origin distribution information for the content delivery network. In particular, the cache node may continue to receive origin distribution information from the other cache nodes of the content delivery network. Here, the cache node, at time T2, identifies that it can increase the ratio of origin requests that are provided to origin server 111. This increase in the ratio to origin server 111 may come as a result of the access information obtained from the alternative nodes, the access information for the local access node, and the overall quantity of origin requests by the cache nodes to each of the origin servers, or any other additional origin distribution information. Once the increase to the ratio is identified, the CN may distribute future origin requests following time T2 to the origin servers according to the newly identified ratio.

Although illustrated as immediate transitions between ratios at time T1 and T2, it should be understood that this is a merely one example of transitioning between ratios. In some implementations, the CN may gradually change between ratios based on the identified origin distribution information. Further, although illustrated as linear ratios in the example of FIG. 5, it should be understood that the ratios may be non-linear based on the origin distribution information for the content delivery network cache nodes, as well as the time since the information was obtained from the other nodes in the network. For example, the CN may provide a first origin request ratio to overcome an identified imbalance in origin requests when the origin distribution information is first received from the at least one other CN. However, over time, the CN may revert back to an even distribution of requests as the origin distribution information ma no longer reflect the current state of the environment.

Figure 6:
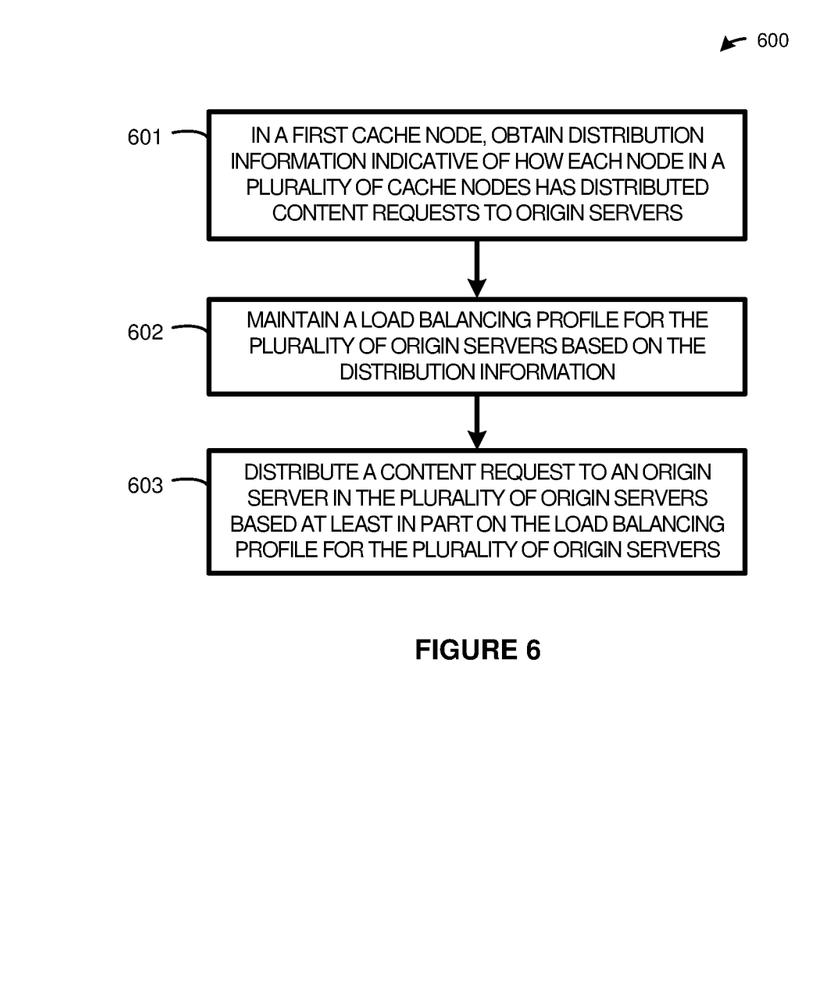
FIG. 6 illustrates a method of operating a cache node in a content delivery network to distribute origin requests to multiple origin servers according to one implementation.

FIG. 6 illustrates a method 600 of operating a cache node in a content delivery network to distribute origin requests to multiple origin servers according to one implementation. The operations of FIG. 2 are referenced parenthetically in the paragraphs that follow, along with references to the elements and systems from communication system 100 of FIG. 1.

As described herein, CNs 120-122 may require origin content requests to retrieve content that is not available in the cache storage for the CNs. To determine which origin server of origin servers 111-112 should be queried with a content request, a CN in CNs 120-122 will obtain distribution information indicative of how each cache node in the plurality of cache nodes has distributed previous content requests to the plurality of origin servers (601). This distribution information may include a quantity of content requests transferred to each origin server, a quantity of data retrieved from each origin server, or any other similar information about previous content requests to origin servers. In some implementations, a CN in CNs 120-122 may identify a first portion of the distribution information indicative of how content requests have been distributed by the local CN, and may further receive a second portion of the distribution information from other CNs of the delivery network. To receive the second portion of the distribution information, a CN may receive a plurality of reports from the other CNs in the network and associate timestamps with each of the reports as they are received.

As the distribution information is obtained for the network, a CN in CNs 120-122 will maintain a load balancing profile for the plurality of origin servers based on the distribution information (602). This load balancing profile may be generated using one or more data structures and/or one or more algorithms that can be used to predict a future distribution of content requests to the origin servers to ensure a balanced distribution of requests to the origin servers. In some implementations, when reports are received from the other CNs in the network, the load balancing profile for the plurality of origin servers may be based on the distribution information received in the reports, as well as the timestamps associated with each of the reports. These timestamps may ensure that distribution information received more recently is given a higher weight in determining the load balancing profile over information that was received at and earlier time.

Based on the generated and maintained load balancing profile for origin servers 111-112, a CN in CNs 120-122 may distribute at least one content request to origin servers 111-112 (603). For example, if CN 122 identified, using the distribution information, that origin server 111 was receiving a disproportionate number of requests in comparison to origin server 112, the load balancing profile may indicate that a larger ratio of requests from CN 122 should be directed at origin server 112. Once a request is made to the origin servers, content may be retrieved, delivered to an associated end user device, and/or cached in a storage system associated with CN 122.

Figure 7:
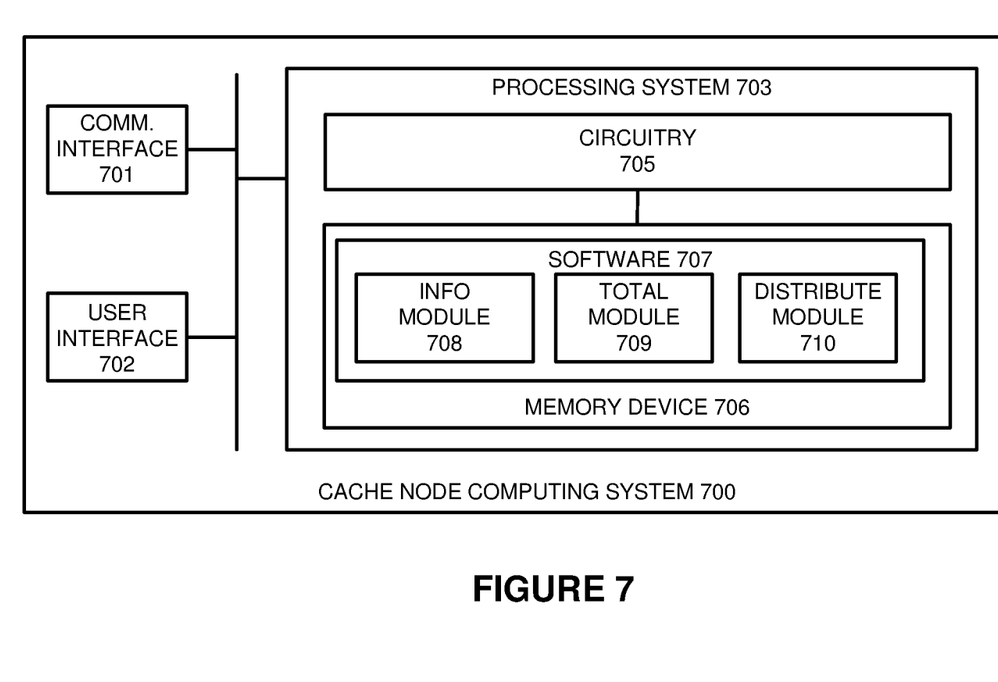
FIG. 7 illustrates a cache node computing system to distribute origin requests to multiple origin servers according to one implementation.

FIG. 7 illustrates a cache node computing system 700 to distribute origin requests to multiple origin servers according to one implementation. Cache node computing system 700 is representative of any computing system or systems with which the various operational architectures, processes, scenarios, and sequences disclosed herein for a cache node may be implemented. Cache node computing system 700 is an example of CNs 120-122, although other examples may exist. Cache node computing system 700 comprises communication interface 701, user interface 702, and processing system 703. Processing system 703 is linked to communication interface 701 and user interface 702. Processing system 703 includes processing circuitry 705 and memory device 706 that stores operating software 707. Cache node computing system 700 may include other well-known components such as a battery and enclosure that are not shown for clarity. Cache node computing system 700 may comprise one or more server computing systems, desktop computing systems, laptop computing systems, or any other computing system, including combinations thereof.

Communication interface 701 comprises components that communicate over communication links, such as network cards, ports, radio frequency (RF), processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 is configured to communicate with origin servers to cache content to be provided to end user devices.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes information (info) module 708, total module 709, and distribute module 710, although any number of software modules may provide the same operation. Operating software 707 may further include an operating system, utilities, drivers, network interfaces, applications, or some other type of software. When executed by processing circuitry 705, operating software 707 directs processing system 703 to operate cache node computing system 700 as described herein.

In at least one implementation, information module 708 directs processing system 703 to receive, via communication interface 701, origin distribution information from at least one alternative cache node in the content delivery network, wherein the origin distribution information comprises a first quantity of origin requests to each origin server in a plurality of origin servers over a period of time. Information module 708 further directs processing system 703 to identify a second quantity of origin requests to each origin server in the plurality of origin servers by computing system 700 over the time period. Once the origin distribution information is identified for computing system 700 and the alternative cache nodes, total module 709 directs processing system 703 to identify a total quantity of requests to the plurality of origin servers based on the first quantity of origin requests and the second quantity of origin requests.

After determining the access information related to the requests from the cache nodes to the origin servers, distribute module 710 directs processing system 703 to receive content requests from a subset of end user devices communicating with the content delivery network, identify new origin requests based on the content requests, and distribute the content requests to the origin servers. In particular, distribute module 710 directs processing system 703 to distribute the new origin requests to each of the origin servers based on the first quantity of origin requests, the second quantity of origin requests, the total quantity of requests, and an elapsed time since the origin distribution information is obtained from the at least one alternative cache node in the content delivery network.

For example, if the alternative cache nodes indicated that an unbalanced number of requests were transferred to one origin node over another, the distribution may indicate that cache node computing system 700 should counter, at least partially, the imbalanced number of requests to the particular origin node. This may include providing an imbalanced ration of origin requests to the other available origin nodes. Further, by monitoring the time elapsed since the origin distribution information is received from the other nodes, cache node computing system 700 may dynamically modify origin access ratios to each of the available origin servers based on how recent the reports are received. For example, computing system 700 may more heavily rely on the origin distribution information when it has been obtained recently, as opposed to the information that has been received further in the past. This may permit computing system 700 to provide a first ratio of requests to the origin servers when access information is first received, and provide different ratio or ratios of request to the origin servers as the access information may not accurately reflect the current state of the computing environment.

Although illustrated in the example of cache node computing system 700 as initiating origin requests based on end user requests, it should be understood that origin requests may occur for a variety of purposes, including purge requests from origin servers, purge requests from administrative devices of the content delivery network, expiration of timers to retrieve new data from the origin server, or for any other similar purpose. Further, it should be understood that in addition to the number of request, the origin distribution information may also include information about the amount of data. retrieved from each origin, the latency associated with each origin, or any other similar information. This information may then also be used by computing system 700 in determining the distribution of origin requests.

Returning to the elements of FIG. 1, CNs 120-122 and origin servers 111-112 can each include communication interfaces, network interfaces, processing systems, computer systems, microprocessors, storage systems, storage media, or some other processing devices or software systems, and can be distributed among multiple devices. Examples of CNs 120-122 and origin servers 111-112 can include software such as an operating system, logs, databases, utilities, drivers, caching software, networking software, and other software stored on a computer-readable medium. CNs 120-122 and origin servers 111-112 may each comprise, in some examples, one or more server computing systems, desktop computing systems, laptop computing systems, or any other computing system, including combinations thereof.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof. End user devices 130-132 can each include communication interfaces, network interfaces, processing systems, computer systems, microprocessors, storage systems, storage media, or some other processing devices or software systems.

Communication links 170-176 each use metal, glass, optical, air, space, or some other material as the transport media. Communication links 170-176 can each use various communication protocols, such as Time Division Multiplex (TDM), asynchronous transfer anode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof Communication links 170-176 can each be a direct link or can include intermediate networks, systems, or devices, and can include a logical network link transported over multiple physical links. Although one main link for each of links 170-176 is shown in FIG. 1, it should be understood that links 170-176 are merely illustrative to show communication modes or access pathways. In other examples, further links can be shown, with portions of the further links shared and used for different communication sessions or different content types, among other configurations. Communication links 170-176 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a content delivery network comprising a plurality of cache nodes that cache content between end user devices and a plurality of origin servers, the method comprising:

in a first cache node of the plurality of cache nodes, obtaining distribution information indicative of how each cache node in the plurality of cache nodes has distributed content requests to the plurality of origin servers;

in the first cache node, maintaining a load balancing profile for the plurality of origin servers based on the distribution information; and in the first cache node, distributing a content request to an origin server in the plurality of origin servers based at least in part on the load balancing profile for the plurality of origin servers.

2. The method of claim 1 wherein the distribution information comprises quantities of the content requests distributed to each origin server in the plurality of origin servers.

3. The method of claim 1 wherein obtaining the distribution information comprises:

receiving a first portion of the distribution information from other cache nodes in the plurality of cache nodes; and identifying a second portion of the distribution information for the first cache node.

4. The method of claim 3 wherein receiving the first portion of the distribution information from the other cache nodes in the plurality of cache nodes comprises receiving the first portion of the distribution information as a plurality of reports from the other cache nodes in the plurality of cache nodes.

5. The method of claim 4 further comprising identifying a timestamp for when each report in the plurality of reports is received by the first cache node, and wherein maintaining the load balancing profile for the plurality of origin servers based on the distribution information comprises maintaining the load balancing profile for the plurality of origin servers based on the distribution information and the timestamps.

6. The method of claim 1 further comprising, in the first cache node, receiving the content request from an end user device, wherein the content request comprises a request for content that is not yet cached by the cache node.

7. The method of claim 6 further comprising receiving new content from the origin server in the plurality of origin servers in response to the content request and distributing the new content to the end user device.

8. The method of claim 7 further comprising caching at least a portion of the new content.

9. The method of claim 1 wherein the distribution information comprises quantities of data received from each origin server in the plurality of origin servers by the plurality of cache nodes.

10. A content delivery network to distribute requests to a plurality of origin servers, the content delivery network comprising:
   a plurality of cache nodes that cache content between end user devices and the plurality of origin servers;
   a first cache node in the plurality of cache nodes configured to:
      obtain distribution information indicative of how each cache node in the plurality of cache nodes has distributed content requests to the origin servers;
      maintain a load balancing profile for the plurality of origin servers based on the distribution information; and
      distribute a content request to an origin server in the plurality of origin servers based at least in part on the load balancing profile for the plurality of origin servers.

11. The content delivery network of claim 10 wherein the distribution information comprises quantities of the content requests distributed to each origin server in the plurality of origin servers.

12. The content delivery network of claim 10 wherein the first cache node configured to obtain the distribution information is configured to receive a first portion of the distribution information from other cache nodes in the plurality of cache nodes and identify a second portion of the distribution information for the first cache node.

13. The content delivery network of claim 12 wherein the first cache node configured to receive the first portion of the distribution information from the other cache nodes in the plurality of cache nodes is configured to receive the first portion of the distribution information as a plurality of reports from the other cache nodes in the plurality of cache nodes.

14. The content delivery network of claim 13 wherein the first cache nodes if further configured to identify a timestamp for when each report in the plurality of reports is received by the first cache node and wherein the first cache node configured to maintain the load balancing profile for the plurality of origin servers based on the distribution information is configured to maintain the load balancing profile for the plurality of origin servers based on the distribution information and the timestamps.

15. The content delivery network of claim 10 wherein the first cache node is further configured to receive the content request from an end user device, wherein the content request comprises a request for content that is not yet cached by the cache node.

16. The content delivery network of claim 15 wherein the first cache node is further configured to receive new content from the origin server in the plurality of origin servers in response to the content request and distribute the new content to the end user device.

17. The content delivery network of claim 16 wherein the first cache node is further configured to cache at least a portion of the new content.

18. A method of operating a cache node in a content delivery network, the content delivery network comprising a plurality of cache nodes that cache content between end user devices and a plurality of origin servers, the method comprising:
   tracking a distribution of content requests sent by the plurality of cache nodes in the content delivery network to the plurality of origin servers;
   receiving a request from an end user device for content that is not yet cached by the cache node;
   selecting an origin server in the plurality of origin servers to retrieve the requested content based at least in part on the distribution of content requests; and
   sending a content request to the selected origin server.

19. The method of claim 18 wherein the distribution of content requests comprises quantities of the content requests distributed to each origin server in the plurality of origin servers.

20. The method of claim 18 wherein tracking the distribution of content requests sent by the plurality of cache nodes to the plurality of origin servers comprises receiving first distribution information as a plurality of reports from other cache nodes in the plurality of cache nodes and identifying second distribution information for the cache node, wherein the method further comprises identifying a timestamp for when each report in the plurality of reports is received by the cache node, and wherein selecting the origin server in the plurality of origin servers to retrieve the requested content based at least in part on the distribution of content requests comprises selecting the origin server in the plurality of origin servers to retrieve the requested content based on the distribution of content requests and the timestamps.

* * * * *